(12) United States Patent
Jacqmarcq et al.

(10) Patent No.: US 10,532,715 B2
(45) Date of Patent: Jan. 14, 2020

(54) STEERING WHEEL UNIT, AIRBAG MODULE, AND STEERING WHEEL BODY

(71) Applicant: AUTOLIV DEVELOPMENT AB, Vargarda (SE)

(72) Inventors: Thierry Jacqmarcq, Cuigy en Bray (FR); Gilles Garret, Rouen (FR); Remi Baillivet, Dampierre-en-Bray (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 2 days.

(21) Appl. No.: 15/569,013

(22) PCT Filed: Apr. 21, 2016

(86) PCT No.: PCT/EP2016/058889
§ 371 (c)(1),
(2) Date: Oct. 24, 2017

(87) PCT Pub. No.: WO2016/170051
PCT Pub. Date: Oct. 27, 2016

(65) Prior Publication Data
US 2018/0126939 A1  May 10, 2018

(30) Foreign Application Priority Data

Apr. 24, 2015 (DE) .................. 10 2015 005 281

(51) Int. Cl.
B60R 21/203 (2006.01)
(52) U.S. Cl.
CPC ........ B60R 21/203 (2013.01); B60R 21/2037 (2013.01)
(58) Field of Classification Search
CPC .............. B60R 21/203; B60R 21/2035; B60R 21/2037
See application file for complete search history.

(56) References Cited

U.S. PATENT DOCUMENTS 5,599,039 A * 2/1997 Goss .................. B60R 21/2035
280/728.2
5,755,458 A * 5/1998 Donovan ............ B60R 21/2035
280/728.1
(Continued)

FOREIGN PATENT DOCUMENTS

DE 10 2008 028 126 A1 12/2009
DE 10 2009 041 539 A1 4/2010
(Continued)

OTHER PUBLICATIONS

International Search Report of PCT/EP2016/058889, dated Jun. 28, 2016.

*Primary Examiner* — Ruth Ilan
(74) *Attorney, Agent, or Firm* — Brinks Gilson & Lione

(57) ABSTRACT

A steering wheel unit (10) for a motor vehicle having, a steering wheel body (12), an airbag module (20) accommodated in a hub region of the steering wheel body (12), which includes a housing (22), an inflator connected to the housing (22), and an airbag (29) folded into the housing (22), and at least three axial positioning units which define the axial position of the housing (22) when not pressed down with respect to the steering wheel body (12). Each of the three axial positioning units include an axial positioning element (40) connected on the module side to the housing (22), or an axial positioning element connected to the steering wheel body on the steering wheel body side, wherein the positioning element features a metal support unit (42). The at least three support units (42) are elements separate from each other.

20 Claims, 17 Drawing Sheets

(56) References Cited

U.S. PATENT DOCUMENTS

| | | | | |
|---|---|---|---|---|
| 5,788,268 A * | 8/1998 | Goss | ............... | B60R 21/2035 280/728.2 |
| 5,975,560 A * | 11/1999 | Fischer | ............... | B60R 21/2035 280/728.2 |
| 7,566,071 B2 * | 7/2009 | Tsujimoto | ............... | B60Q 5/003 280/731 |
| 8,256,797 B2 | 9/2012 | Sakurai et al. | | |
| 8,500,156 B2 * | 8/2013 | Banno | ............... | B60R 21/2037 280/728.2 |
| 8,919,812 B2 * | 12/2014 | Schutz | ............... | B60R 21/2037 280/728.2 |
| 2004/0108690 A1 * | 6/2004 | Schutz | ............... | B60R 21/2037 280/728.2 |
| 2005/0230943 A1 * | 10/2005 | Thomas | ............... | B60Q 5/003 280/731 |
| 2011/0089672 A1 | 4/2011 | Nebel et al. | | |
| 2011/0204602 A1 | 8/2011 | James et al. | | |
| 2011/0248481 A1 * | 10/2011 | Amamori | ............... | B60R 21/2035 280/728.2 |
| 2012/0313357 A1 * | 12/2012 | Yamaji | ............... | B60R 21/203 280/731 |
| 2015/0123383 A1 * | 5/2015 | Yoshida | ............... | B60R 21/2037 280/728.2 |
| 2015/0336529 A1 * | 11/2015 | Nebel | ............... | B60R 21/2037 280/728.2 |
| 2016/0031399 A1 | 2/2016 | Andersson | | |
| 2017/0050603 A1 * | 2/2017 | Spencer | ............... | B60R 21/2035 |
| 2017/0066398 A1 * | 3/2017 | Bachmann | ............ | F16B 19/004 |
| 2017/0174166 A1 * | 6/2017 | Eireos Garcia | ..... | B60R 21/2037 |

FOREIGN PATENT DOCUMENTS

| | | | | |
|---|---|---|---|---|
| DE | 102010006358 A1 * | 8/2011 | ......... | B60R 21/2037 |
| DE | 10 2010 023 180 A1 | 12/2011 | | |
| DE | 102010023180 A1 * | 12/2011 | ......... | B60R 21/2037 |
| DE | 10 2013 002 557 A1 | 8/2014 | | |
| EP | 2213523 B1 * | 3/2013 | ............ | B60R 21/20 |
| JP | 4710151 B2 * | 6/2011 | | |
| JP | 5290827 B2 * | 9/2013 | | |
| JP | 5621543 B2 * | 11/2014 | | |
| WO | WO-9815431 A1 * | 4/1998 | ............ | B60Q 5/003 |
| WO | WO-2010078896 A1 * | 7/2010 | ......... | B60R 21/2037 |
| WO | WO-2013051409 A1 * | 4/2013 | ......... | B60R 21/2037 |
| WO | WO-2013070905 A1 * | 5/2013 | ......... | B60R 21/2037 |
| WO | WO 2013/154282 9 A1 | 10/2013 | | |

\* cited by examiner

STEERING WHEEL UNIT, AIRBAG MODULE, AND STEERING WHEEL BODY

CROSS-REFERENCE TO RELATED APPLICATION

This application is a 35 U.S.C. § 371 national phase application of International PCT Application No.: PCT/EP2016/058889, filed Apr. 21, 2016, which claims the benefit of priority under 35 U.S.C. § 119 to German Patent Application No.: 10 2015 005 281.0, filed Apr. 24, 2015.

FIELD OF THE INVENTION

The invention relates to a steering wheel unit for a motor, to an airbag module for use in one such steering wheel, and to a steering wheel body for use in one such steering wheel unit.

BACKGROUND

In nearly every modern passenger vehicle, an airbag module is accommodated in the hub region of the steering wheel, which features a housing, an inflator connected to the housing, usually in the form of a gas generator, and an airbag folded into the housing. The steering wheel body herein usually features a receptacle with a bottom and a side, inner wall. In the design known as the "floating module;" the housing is connected to the steering wheel body by means of compression springs, so that it can be pressed down against the force of these springs to operate the horn. To position the housing in the axial direction and to hold the housing against the steering wheel body in the case of an impact, frequently several, and generally three, axial positioning units are provided, which act between housing and steering wheel body and which hold the module against the steering wheel body even during a vehicle impact.

The housing generally consists mostly of plastic, however, due to the large forces occurring during an impact, as a rule it is not possible to manufacture the axial positioning units entirely from plastic. In this regard the generic document DE 10 2010 023 180 A1 proposes a steering wheel unit whose housing features a metal base plate and a housing side wall consisting of plastic. O-shaped lashings joined together with the metal base plate which also forms the bottom of the housing, extend as a single piece downward in the direction of the bottom of the receptacle for the airbag module. These lashings are covered in sections by plastic coverings which extend away from the housing side wall. This forms axial positioning elements on the module side, and hooks extending from the steering wheel body engage into each one. Each of these module-side axial positioning elements features a support unit (the lashing) consisting of metal, and a plastic element covering this support unit in sections.

The disadvantage of the above-described prior art is that the unit is relatively large and thus heavy and difficult to produce, and a flexible bending part of metal is needed for the housing bottom with the molded on lashings.

Proceeding from the problem described above, an object of the present invention is to improve a steering wheel unit of the kind described above, such that the airbag module can be produced with a reduced expense and a reduced weight.

This problem is solved by a steering wheel unit, an airbag module for use in one such steering wheel and, a steering wheel unit for use in one such steering wheel unit as are described by this specification and shown in the accompanying Figures.

SUMMARY OF THE INVENTION

According to the present invention, the at least three support units are mutually separate elements. And thus, very little metal is needed, which firstly results in a reduction in weight. Furthermore, the comparatively small, separate support units are easy to produce.

As also in DE 10 2010 023 180 A1, each support unit herein can form an axial positioning element on the module side, or it can form an axial positioning element on the steering-wheel body side, or a part thereof. The former case will be discussed first as follows.

In this case the supporting parts are disposed preferably on a perimeter side wall of the housing. This makes the assembly very simple.

Since the support units must absorb relatively large tensile forces upon the occurrence of a vehicle impact, they each feature preferably one U-shaped, lower region, through which they are coupled to the steering wheel body. An upper region then features an attachment section which is connected to the housing. This at least one actuation section points preferably in the direction of the lower region and is accommodated in a receptacle of the housing, especially of the side wall. To prevent flapping noises, each U-shaped region features preferably one plastic element which covers the support unit, at least in sections. This plastic element can snap onto the support unit or can be molded onto it.

With respect to the embodiment of the axial positioning units according to the present invention, the sections of the module-side positioning elements which are in contact with the positioning elements (hooks) on the steering wheel body-side, are preferably located, underneath the bottom of the housing, that is, relatively far away from the center of gravity. In order to obtain a precise radial positioning and to prevent unintentional movements of the module in the radial direction, in the region of each module-side axial positioning element it can be an advantage to provide an elastic radial positioning element extending radially from the side wall of the housing.

In a first, preferred embodiment, the support units are flexible, punched parts produced from sheet metal. Thus the support units can be very easily produced at low cost. In this case it is preferable that each support unit have two attachment sections which are formed by the ends of the piece of wire. In this case it is additionally preferred that the elastic, radial positioning means each extend between two parallel legs of the U-shaped regions of the support units, wherein the elastic radial positioning means can be a single piece with the housing.

In a second, preferred embodiment of the present invention, the support units are flexible punched parts produced from sheet metal. This has the particular advantage that the radial positioning elements can be designed as a single piece with the flexible, punched parts of the axial positioning elements.

In a second embodiment of the present invention, the support units form the axial positioning elements on the module side, or are a part thereof. Here again, the supporting parts can be produced preferably either as curved wire pieces or as flexible parts punched from sheet metal.

The preferred application of the invention is in steering wheel units with a "floating module" as described above. However, the invented embodiment of the axial positioning elements on the module-side or steering-wheel body-side can also be used when the module does in fact snap into the steering wheel body, but when in operation cannot be pressed against it.

Frequently it will be preferred to design all of the at least three axial positioning units as identical (thus with equivalent support units), but this is not absolutely necessary. It is also possible to provide different support units in one steering wheel unit, for example, one in the form of a flexible, punched part, and two in the form of curved wire pieces (or vice-versa). It would even be possible that one support unit in one steering wheel unit is used as a module-side axial positioning element (or as a part thereof) and two support units are used as steering-wheel body-side axial positioning elements (or vice-versa).

BRIEF DESCRIPTION OF THE DRAWINGS

The invention will now be explained in greater detail based on exemplary embodiments with reference to FIGS. 1-24, summarized as follows.

DETAILED DESCRIPTION OF THE INVENTION

Figure 1:
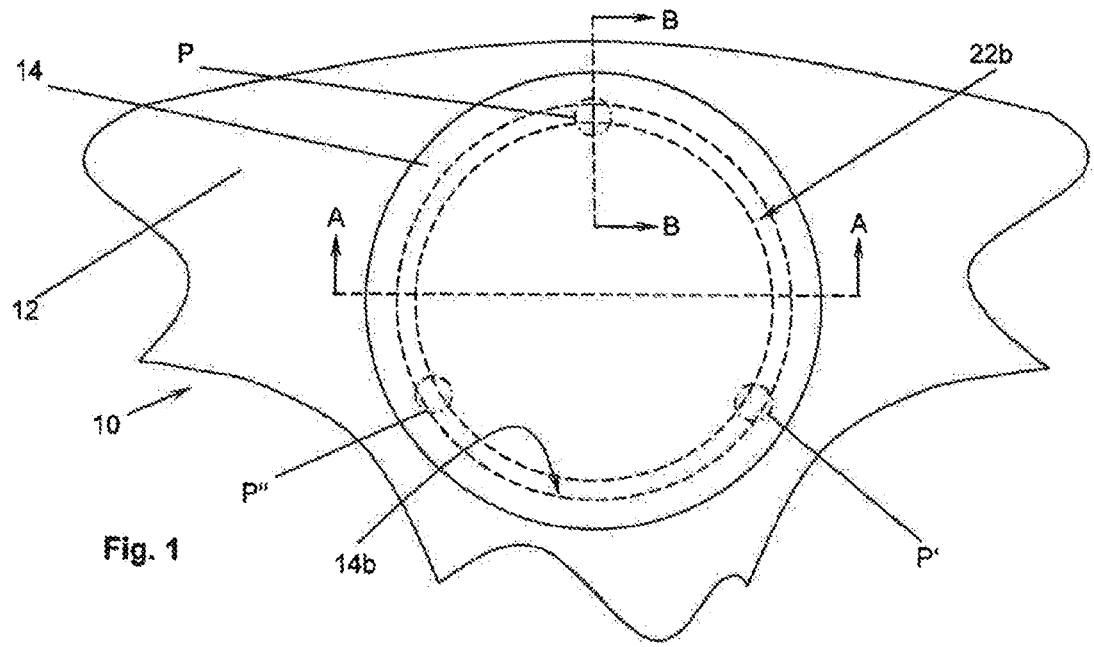
FIG. 1: A schematic, top view of the hub region of a steering wheel unit.
Figure 2:
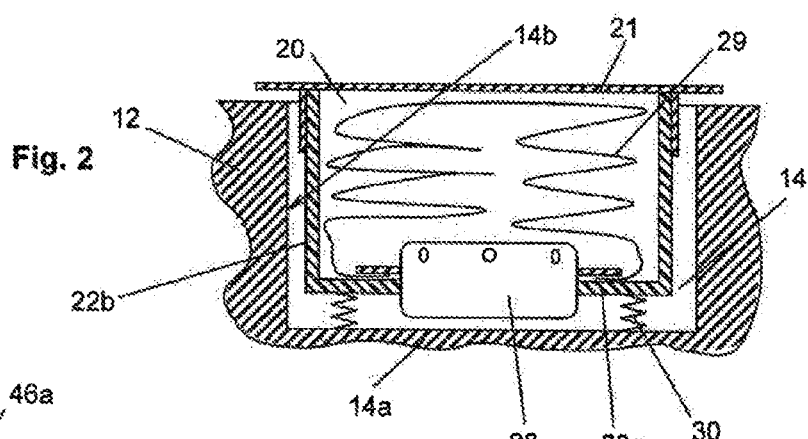
FIG. 2: A cross section along plane A-A in FIG. 1.

FIG. 1 shows a highly stylized, top view of the hub region of a steering wheel unit 10. FIG. 2 likewise shows a highly stylized cross section along the plane A-A of FIG. 1. To the extent that it is relevant to the present invention, the steering wheel unit 10 consists of a steering wheel body 12 with a receptacle 14 in the hub region, and an airbag module 20 which is accommodated herein. In FIG. 1, the side, inner wall 14b of the receptacle 14, and also the outer wall of a side wall 22b of a housing 22 of the airbag module 20 are depicted by dashed lines. The steering wheel unit 10 pertains to a steering wheel unit with a "floating module," as is indicated in FIG. 2. This means that the housing 22 of the airbag module 20 is connected by coil spring 30 to the steering wheel body 12, namely to the bottom 14a of the receptacle for the airbag module.

In addition to the mentioned housing 22, which features a bottom 22a and a side wall 22b, the airbag module 20 also features a gas generator 28 acting as an inflator, an airbag 29 folded into the housing 22, and a covering 21 which seals off the housing 22. In addition to being connected via the coil spring 30, the housing 22 and the steering wheel unit 10 are additionally connected via three axial positioning units, wherein additionally also one elastic radial positioning element each is provided in the region of the stated axial positioning units; these radial positioning elements extend between housing 22 and side, inner wall 14b of the receptacle, so that three positioning units P, P', P" are obtained.

Figure 3:
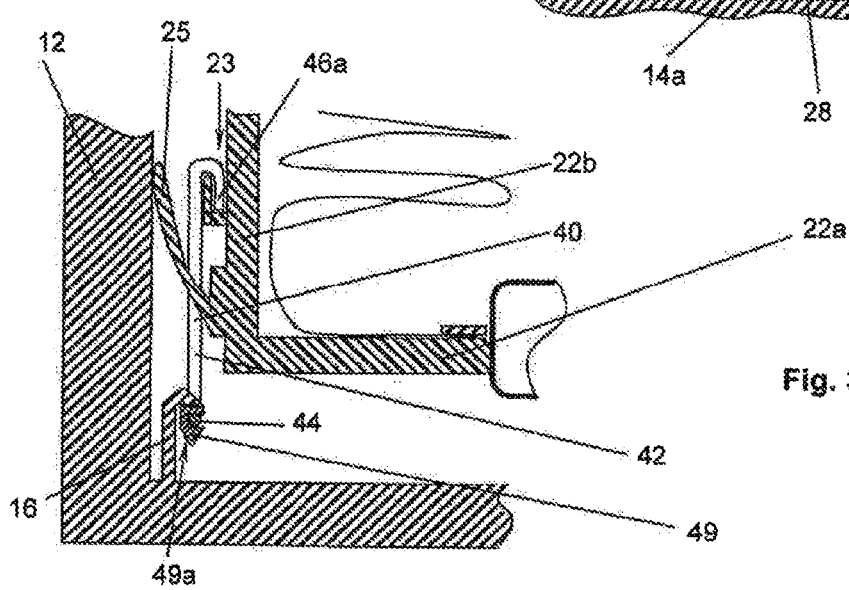
FIG. 3: An enlarged cross section along plane B-B in FIG. 1, wherein an axial positioning unit and a radial positioning element are depicted schematically.
Figure 4:
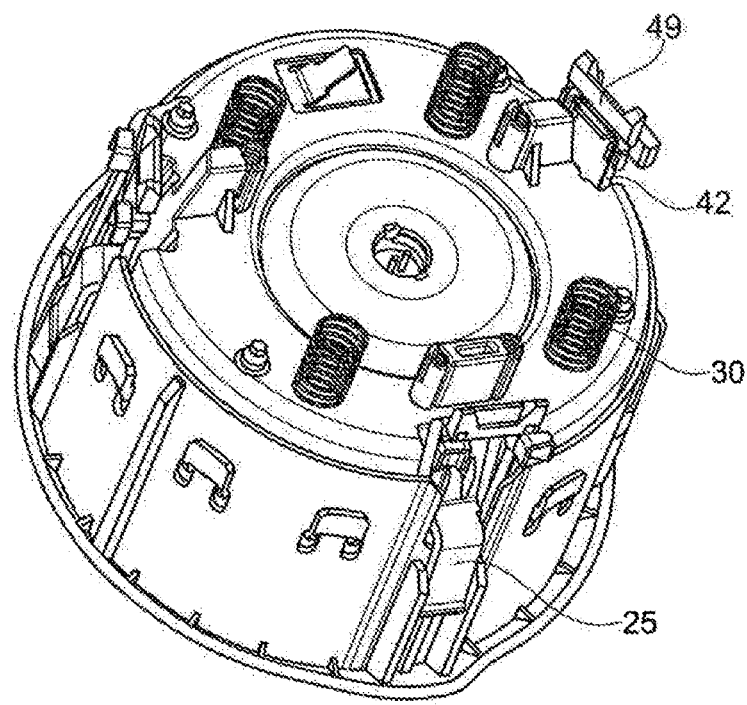
FIG. 4: The airbag module of FIGS. 1 to 3 in a detailed, perspective view.
Figure 5:
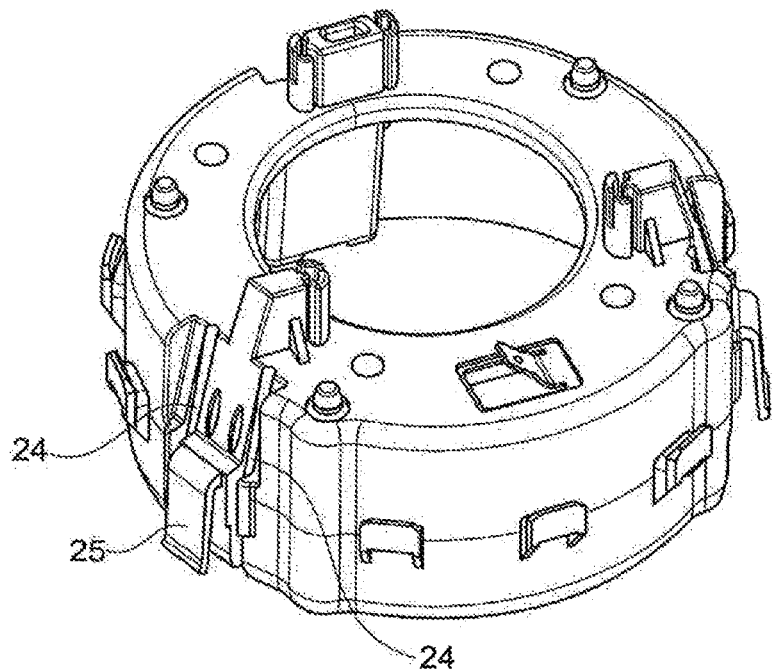
FIG. 5: The plastic housing of the airbag module.
Figure 6:
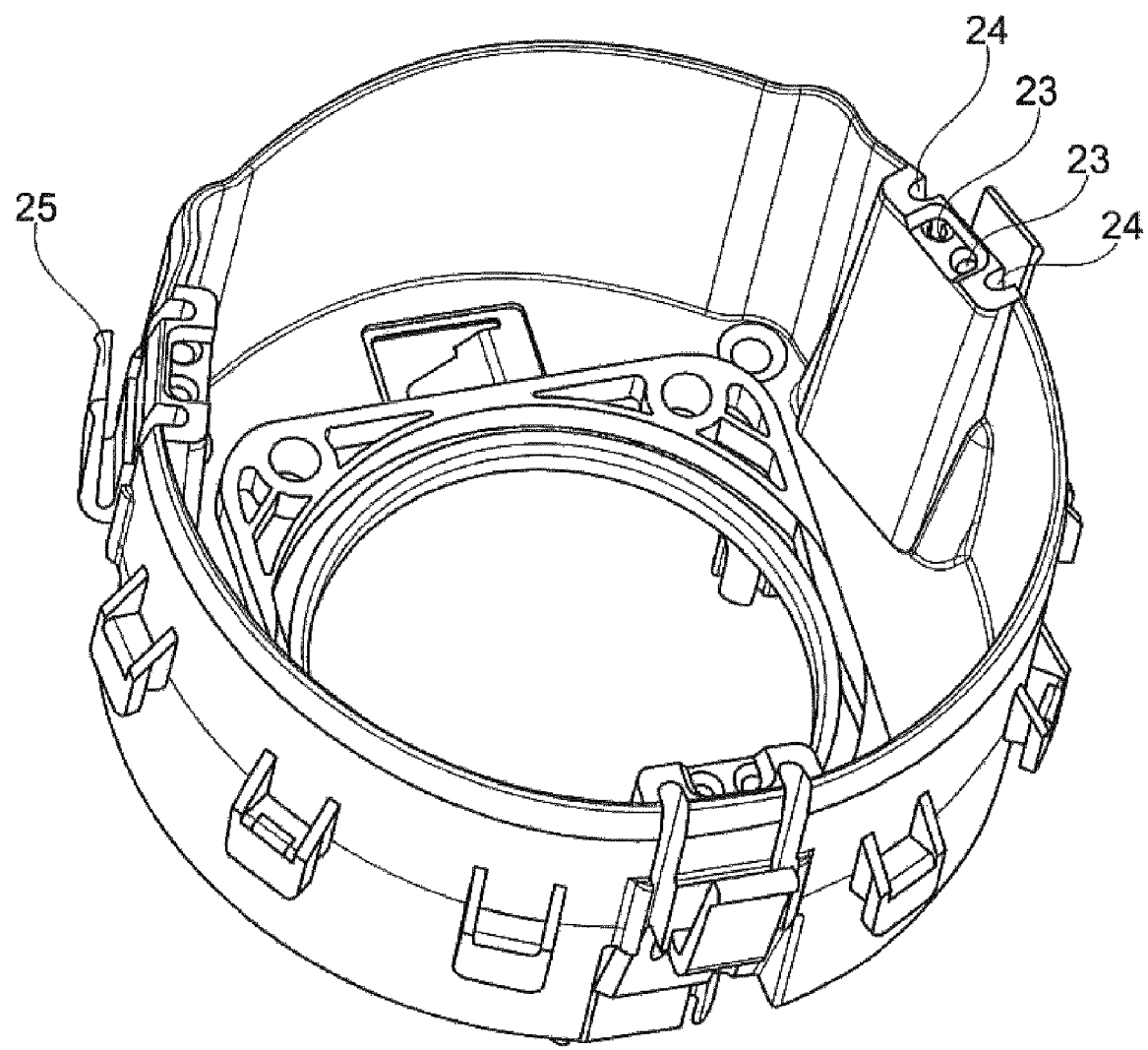
FIG. 6: The plastic housing of FIG. 5 seen from a different viewing angle.

FIG. 3 shows a schematic cross section through one such positioning unit P, which consists of an axial positioning unit and a radial positioning element. However, at this point it should be emphasized that also exemplary embodiments of the invention are possible, in which no additional, radial position element is provided in the region of the axial positioning units. All positioning units may have the same design, so that the description of one of these positioning elements is sufficient.

Each axial positioning unit features an axial positioning element 40 connected on the module side to the housing 22, and a retaining hook 16 on the side of the steering wheel body and which engages in a section of the module-side axial positioning element 40.

A first exemplary embodiment of the module-side axial positioning element 40 and its attachment to the housing 22 will now be explained in detail, with reference to FIGS. 3 to 10, wherein FIG. 3 is a highly schematic representation, whereas FIGS. 4 to 10 are perspective representations true to detail.

The axial positioning element on the module side consists of two parts, namely of a support unit 42 and of a plastic element 49 that snaps into the support unit 42. The metal, in particular steel support unit 42 in the first exemplary embodiment is a wire element, that is, it consists of a curved wire piece. This wire element features a U-shaped, lower region 44 and an upper region 46, wherein the upper region features two reinforcing sections which are connected to the housing 22. The reinforcing sections are the two ends 46a, 46*b* of the wire element extending parallel to each other in the direction of the U-shaped, lower region 44. The side wall 22*b* features an accommodating drilled hole 23 for each end section 46*a*, 46*b* of a wire section (and the term "drilled" is not to be understood in terms of production, but rather geometrically as describing a hole or bore). The accommodating drilled holes 23 extend in the axial direction. Neighboring each accommodating drilled hole 23 there extends a groove 24 on the outside of the side wall 22*b* to accommodate one leg of a wire element. Between two such grooves 24 there extends one L-shaped, elastic radial positioning arm 25 each, passing outward from the side wall 22*b*. The entire housing 22 can be a single-piece, injection-molded plastic part.

Figure 7:
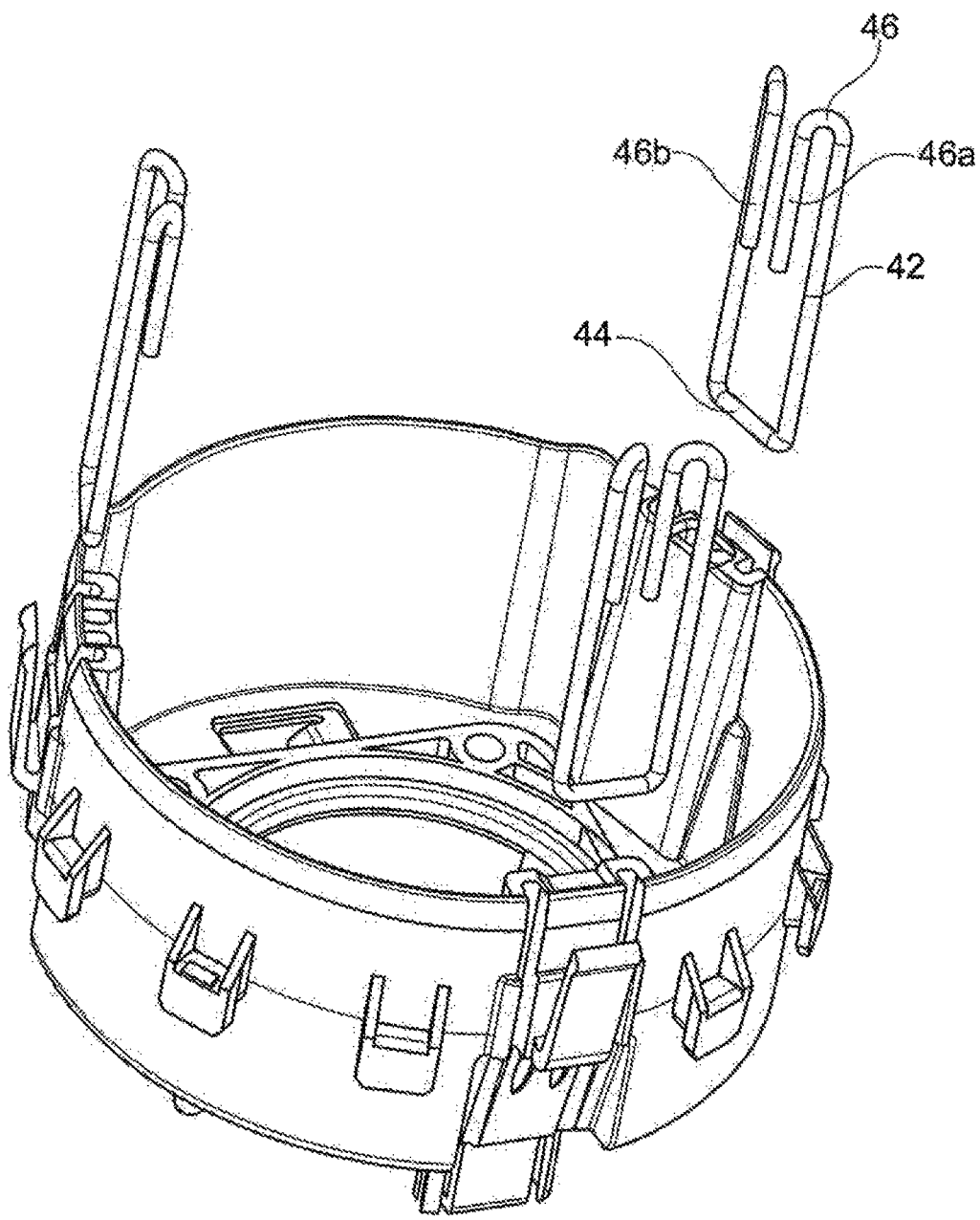
FIG. 7: The plastic housing from FIG. 6 (shown for a different viewing angle) and also the support units of the three axial position elements on the module side.
Figure 8:
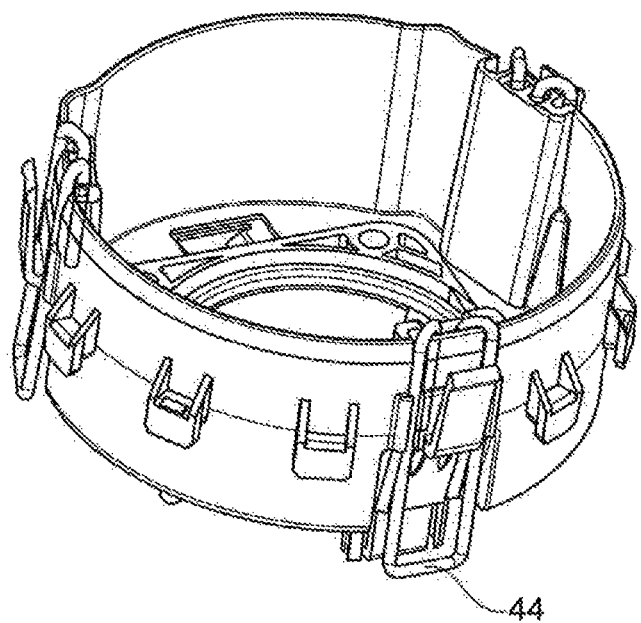
FIG. 8: The depiction in FIG. 7, after placement of the support units on the housing.
Figure 9:
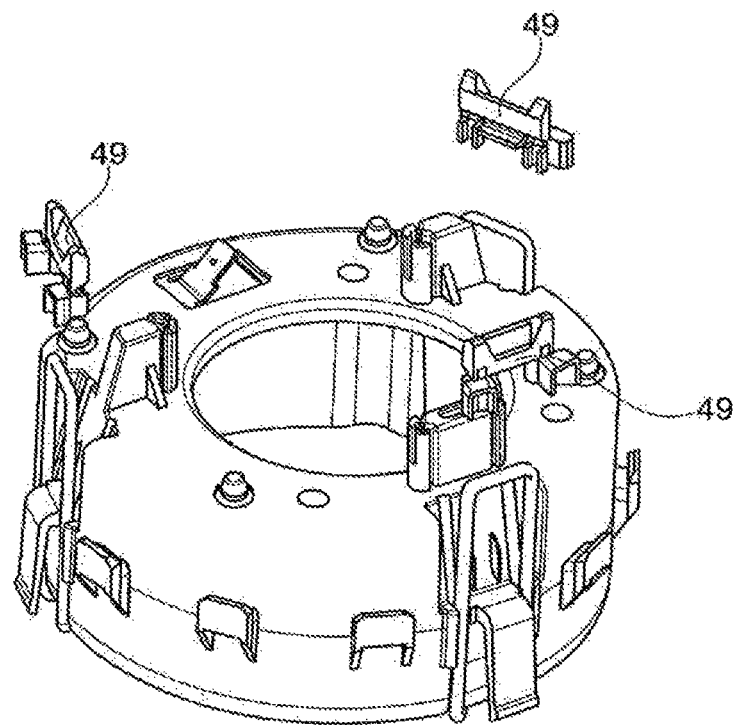
FIG. 9: The depiction in FIG. 7, plus three plastic elements which snap into the support units.

Assembly of the axial positioning elements on the housing 22 is very simple: first, the support units (that is, the wire elements) are inserted by their ends into the accommodation drilled holes 23 provided for this purpose (see FIGS. 7 and 8). Next, a plastic element 49 is snapped onto each U-shaped, lower region 44 of a support unit 42 (see in particular, FIGS. 4, 9 and 10). Assembly of the radial positioning elements is not necessary, since they are already formed onto the housing as a single piece.

After conclusion of the overall assembly of the airbag module 20 (placement of the gas generator, folding of the airbag, placement of the covering 21), the airbag module 20 can be easily snapped into the steering wheel body 12, wherein the snap process takes place through elastic deformation of the support units 42. To enable this procedure, the plastic elements 49 feature slant surfaces 49*a*.

Figure 10:
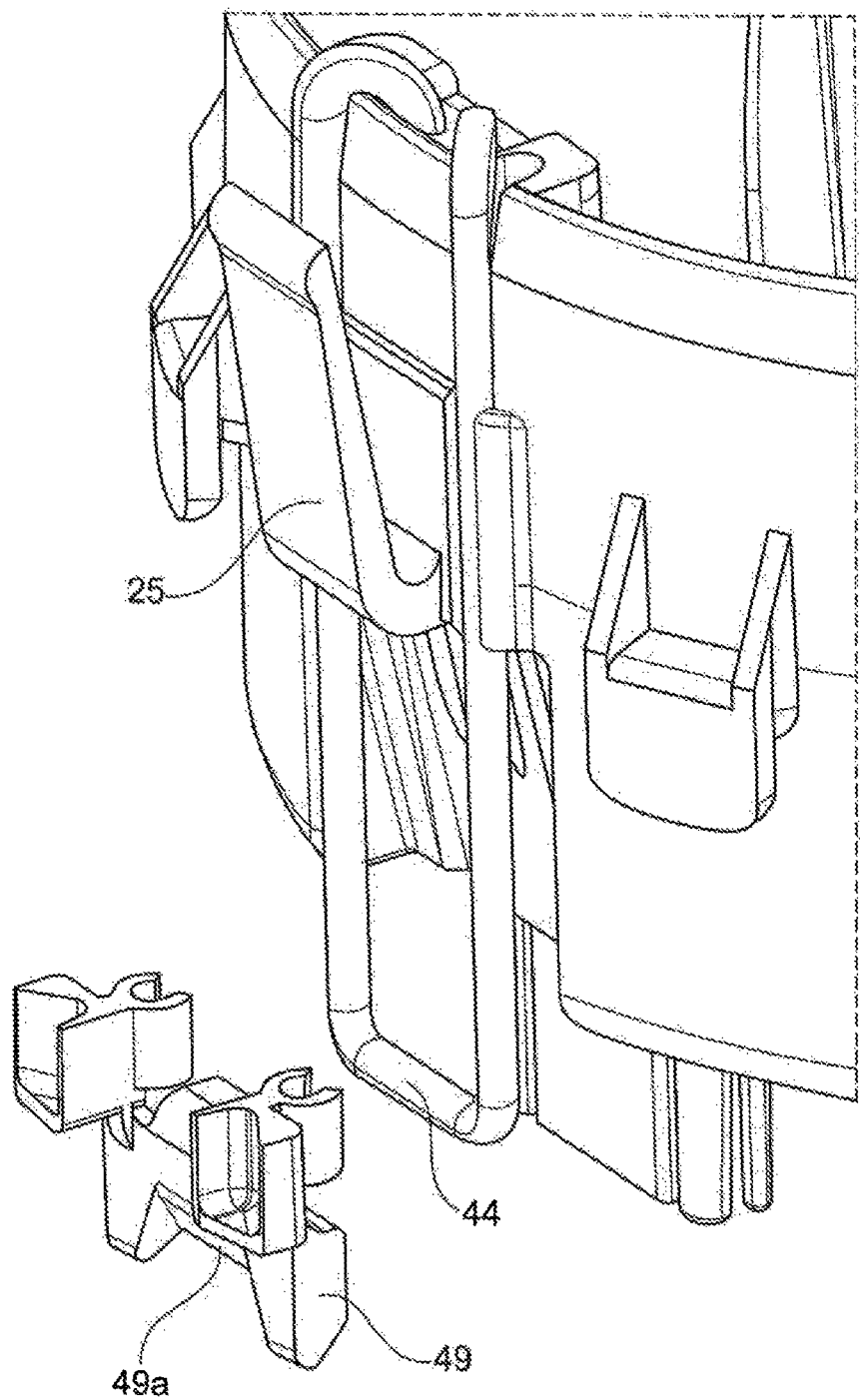
FIG. 10: An enlarged depiction of a section from FIG. 9, but in reverse orientation.
Figure 11:
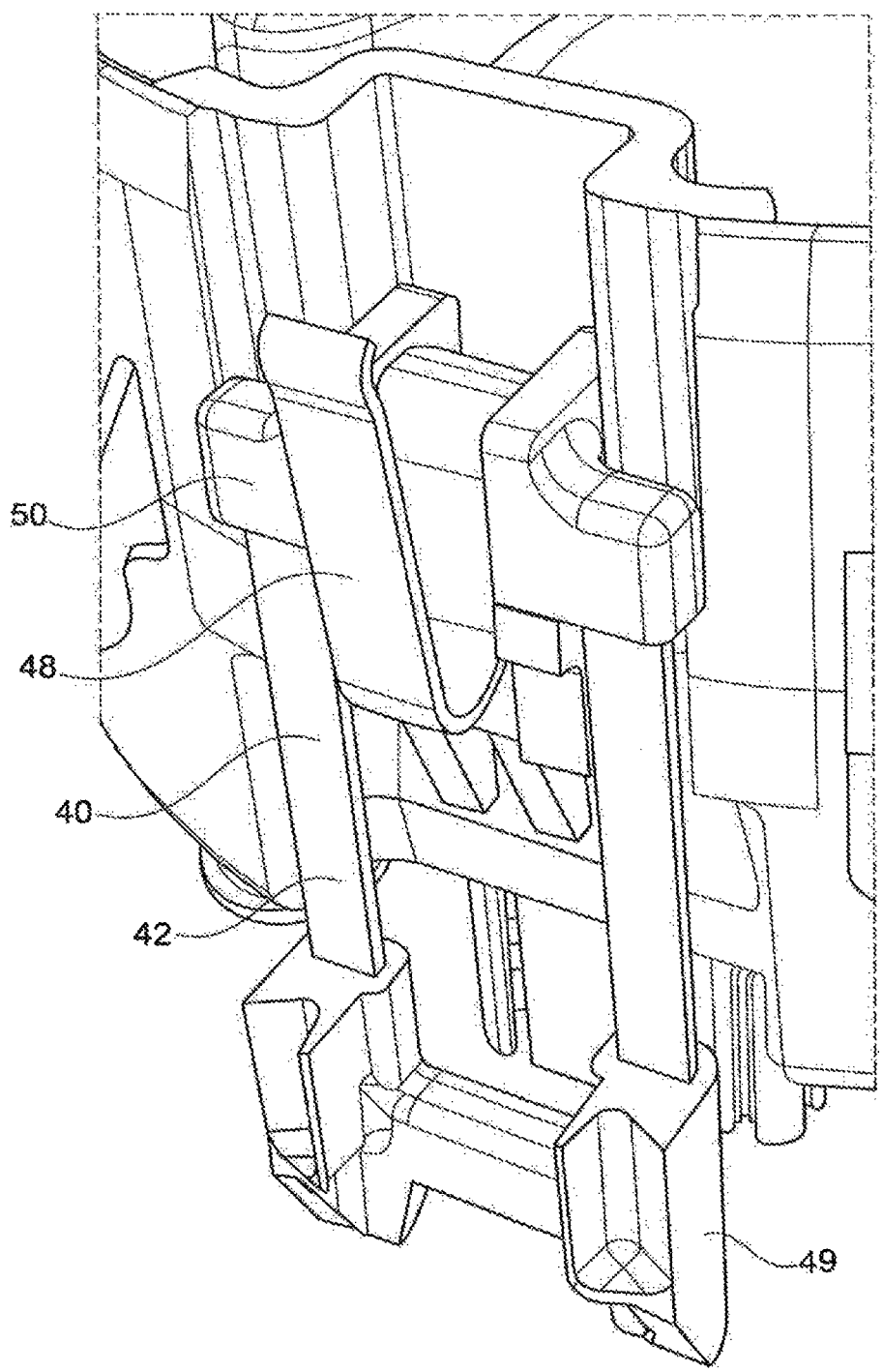
FIG. 11: A second exemplary example of a module-side axial positioning element in a representation corresponding to that of FIG. 10, FIG. 12: Another exemplary embodiment of a module-side axial positioning element in a representation corresponding to that of FIG. 10, FIG. 13: The support unit of the axial positioning element of the exemplary example of FIG. 12, FIG. 14: The support unit from FIG. 13 with plastic elements arranged thereon.
Figure 12:
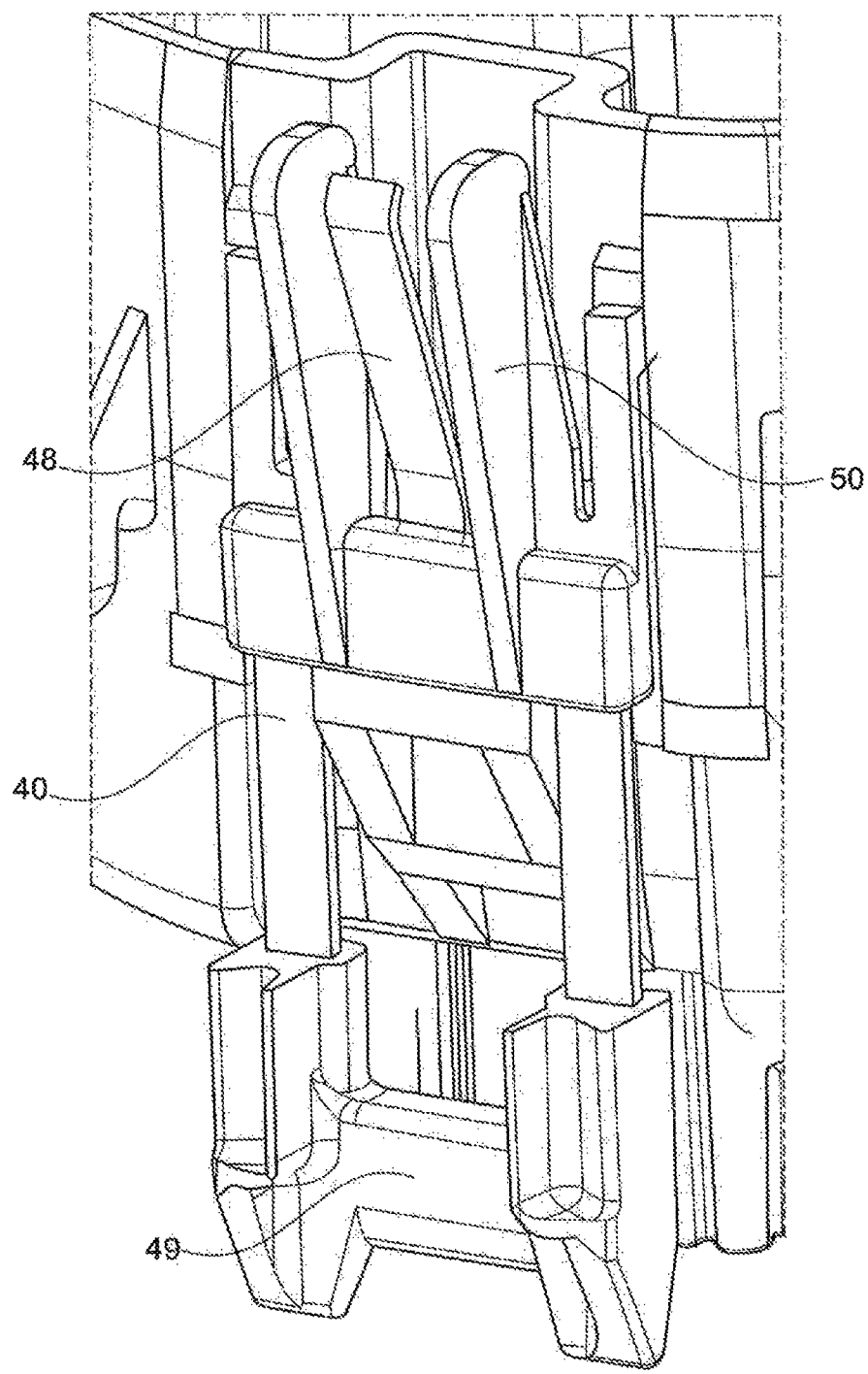
Figure 13:
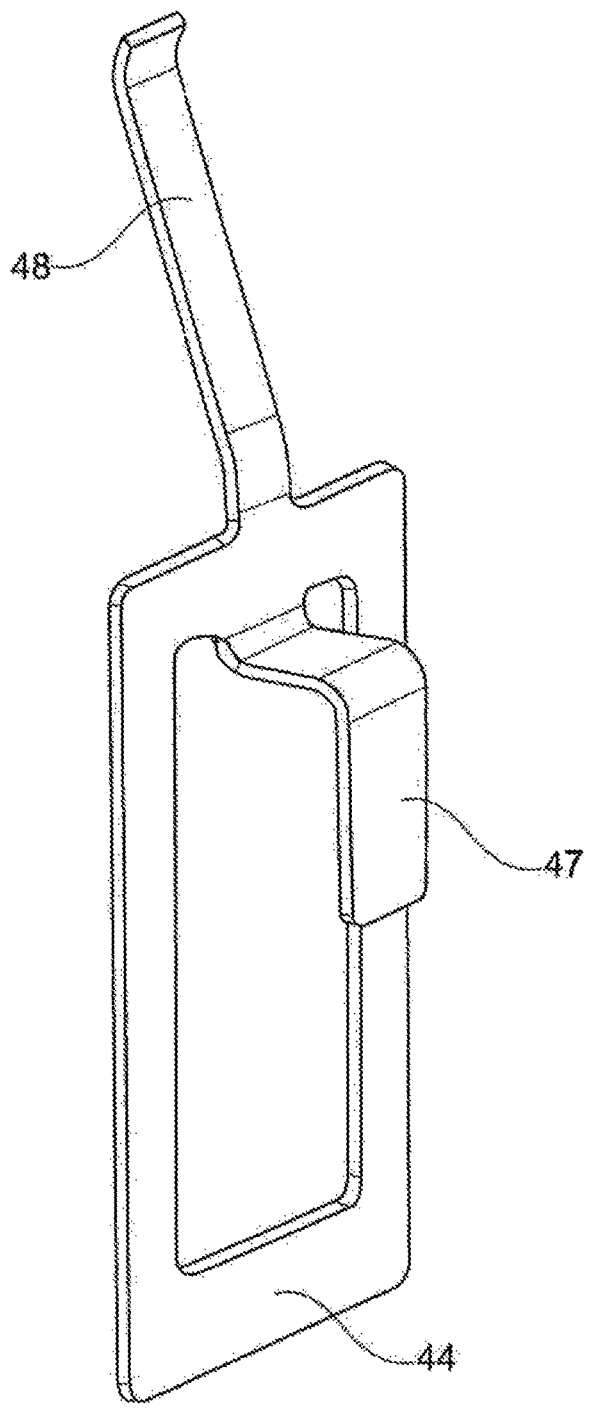

FIG. 11 depicts a second embodiment of an axial positioning element 40 on the module side, in a representation corresponding to that of FIG. 10. FIG. 12 depicts the support unit 42 of this module-side axial positioning element 40. In contrast to the first exemplary embodiment, the support unit 42 here is a flexible, punched part with an O-shaped main section, a reinforcing arm 47 extending from the upper end of the O (wherein this reinforcing arm extends in the direction of the lower end of the O which forms the lower, U-shaped region 44), and an elastic radial positioning arm 48 of the support unit extending likewise from the upper end of the O. To accommodate the connecting arm 47, the side wall 22*b* of the housing 22 features a corresponding, slotted receptacle.

At the U-shaped, lower region 44 of the support unit 42 there is disposed also a plastic element 49, wherein this depicted exemplary embodiment is created by overmolding of the U-shaped, lower region 44. In addition, the upper end of the O-shaped region is overmolded by a plastic element (additional plastic element 50).

Figure 14:
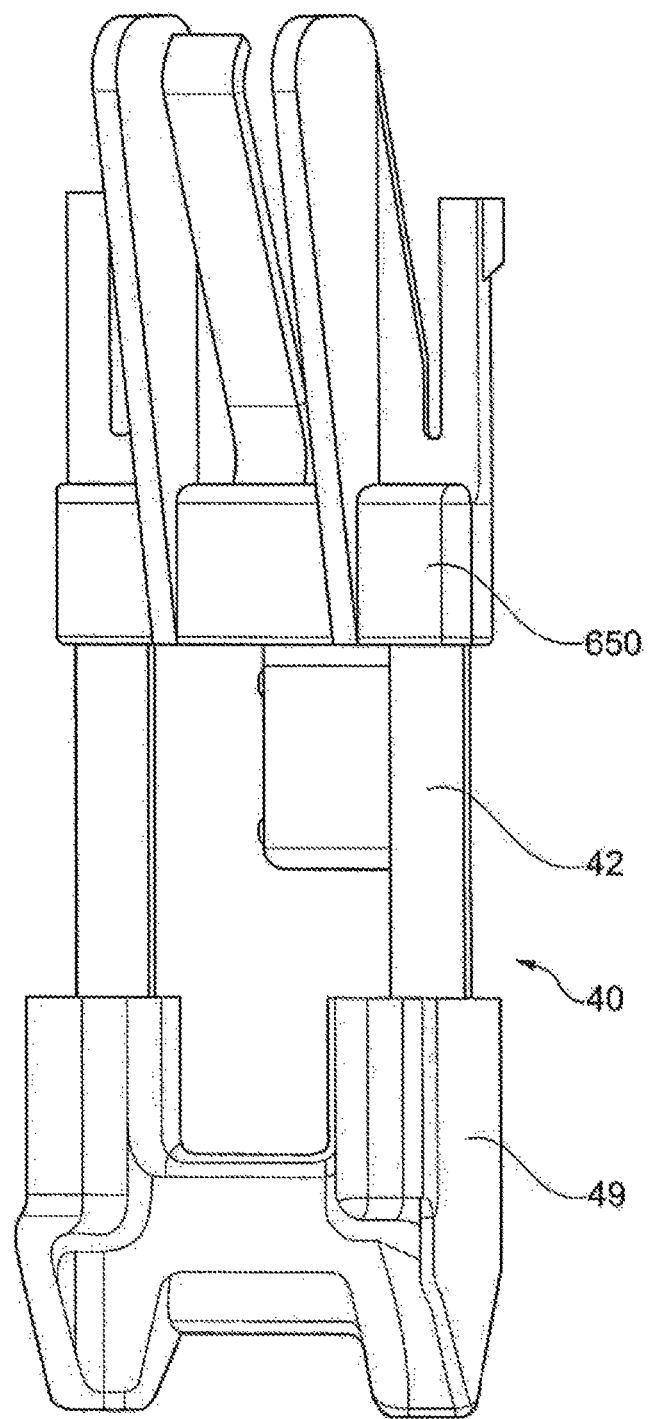
Figure 15:
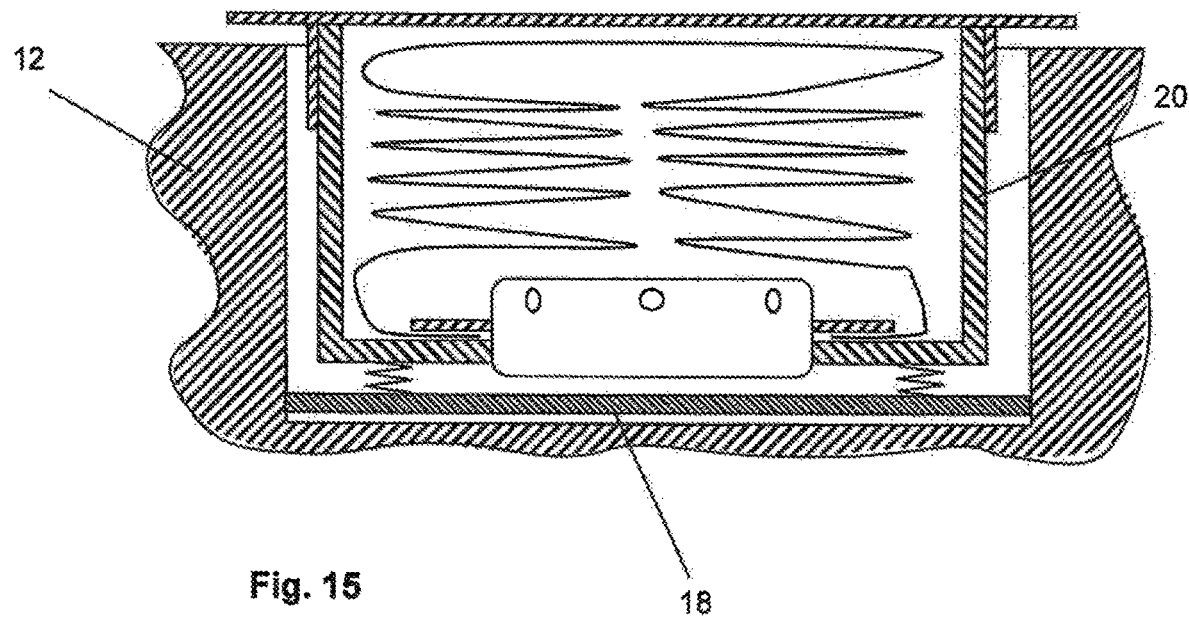
FIG. 15: A first exemplary embodiment of a second design of the invention in a representation corresponding to FIG. 2, FIG. 16: The exemplary embodiment of FIG. 15 in a representation corresponding to FIG. 3, FIG. 17: A support unit of an axial positioning element on the side of the steering wheel-body.

FIG. 14 depicts one variant of the just-described exemplary embodiment, which differs exclusively through the shape of the elastic, radial positioning arm 48 of the support unit.

A second design of the invention is described with reference to FIGS. 15 to 24. In conformance with the first described design, the second design also features three separate support units 142 made of metal. But in contrast to the first design, these units do not form a part of the module-side axial positioning elements (or parts thereof), but rather they form the axial positioning elements 140 on the side of the steering wheel body. In contrast to the described exemplary embodiments of the first design, the steering wheel body 12 features in its hub region a spacer plate 18 (which could also be designated as a horn plate) which is a part of the steering wheel body 12 according to the definitions being used here. It should be emphasized at this point that this kind of spacer plate 18 could also be present in the exemplary embodiments of the first design; in this case the retaining hooks 16 could extend from this spacer plate 18, but this is not illustrated in the Figures in connection with the first design. In addition it should be emphasized that a spacer plate 18 like that provided in the exemplary embodiments described for the second design, is not required in the second design; basically the support units 142 could also extend directly from the skeleton of the steering wheel body 12. The position of the spacer plate 18 becomes clear from a view of FIG. 15, which otherwise corresponds essentially to FIG. 2. The spacer plate 18 is at least indirectly securely attached to the skeleton of the steering wheel body.

Figure 16:
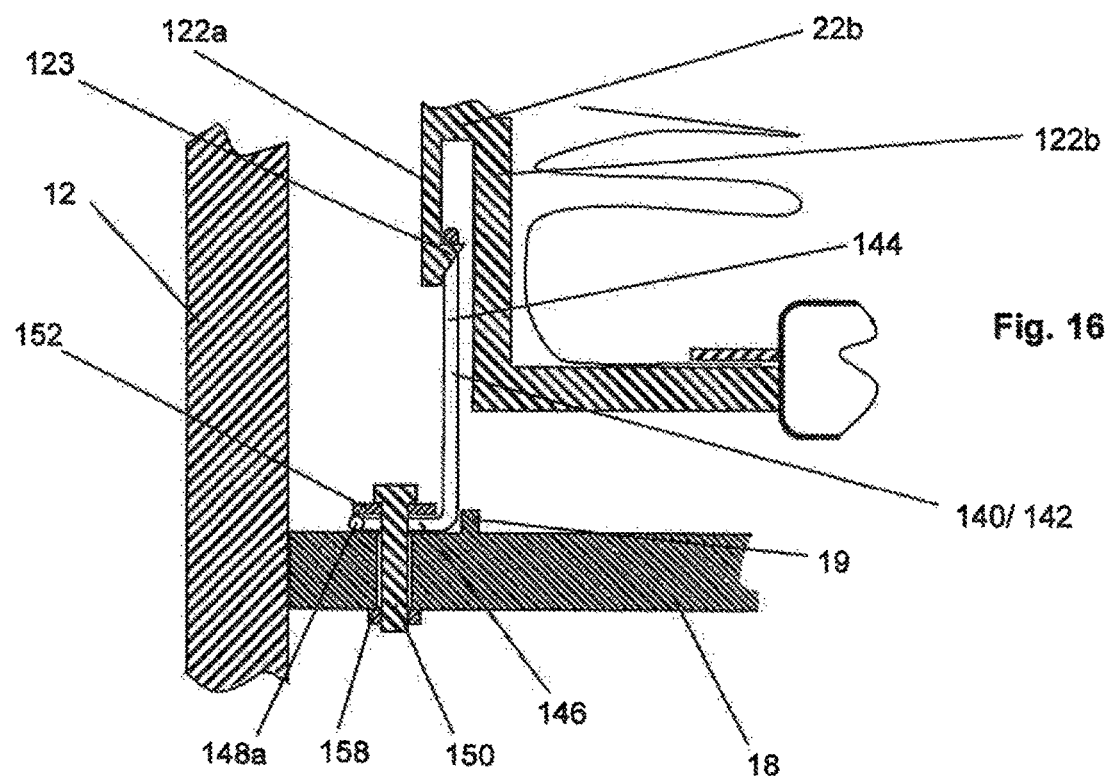
Figure 17:
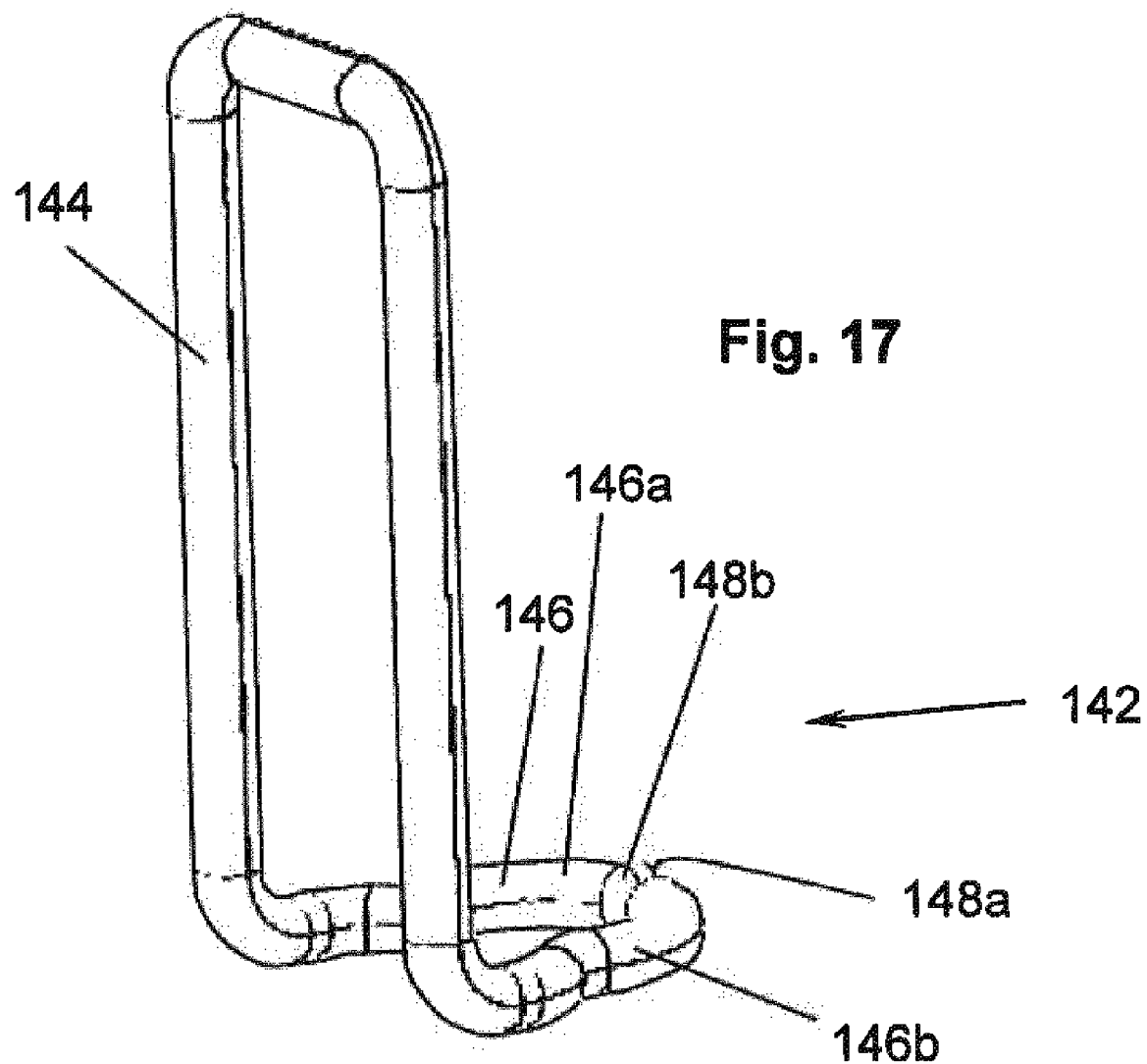
Figure 18:
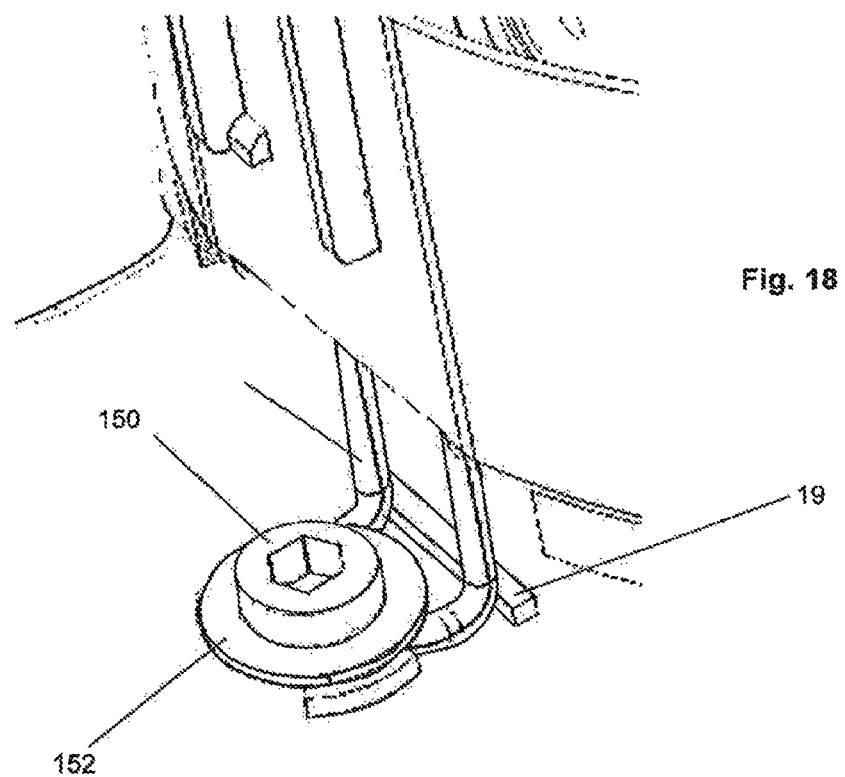
FIG. 18: Essentially showing what is depicted in FIG. 16, but in a more detailed, perspective representation.

As can be discerned from FIG. 16, which corresponds to FIG. 3 of the first exemplary embodiment of the first design, each support unit 142 of an axial positioning element 140 on the steering wheel side, is screwed (depicted) or riveted (not depicted) to the spacer plate 18. As is evident in particular from FIG. 17, the support unit 142 is a curved wire piece, as in the first exemplary embodiment of the first design. The supporting part 142 features a U-shaped region (corresponding here also to the first exemplary embodiment of the first design), however, here it is the upper region (U-shaped, upper region 144). An attachment region 146 bends off essentially at a right angle (preferably at exactly a right angle) from the U-shaped, upper region 144, so that in the assembled state it rests in the radial plane of the steering wheel body 12. The attachment region 146 is formed by the two end sections 146*a*, 146 of the wire piece, and ends at the two ends 148*a*, 148*b* of the wire section. The two ends 146*a*, 146*b* of the supporting part 142 point toward each other. As will be seen from the following exemplary embodiments, this is not compulsory. The attachment to the spacer plate 18 occurs, as can be seen in particular from FIGS. 18 and 19, by a screw 150, a washer 152 and a nut 158. For precise positioning in the radial direction, a stop 19 is provided on the spacer plate 19, as is depicted in FIGS. 16, 18 and 19.

Figure 19:
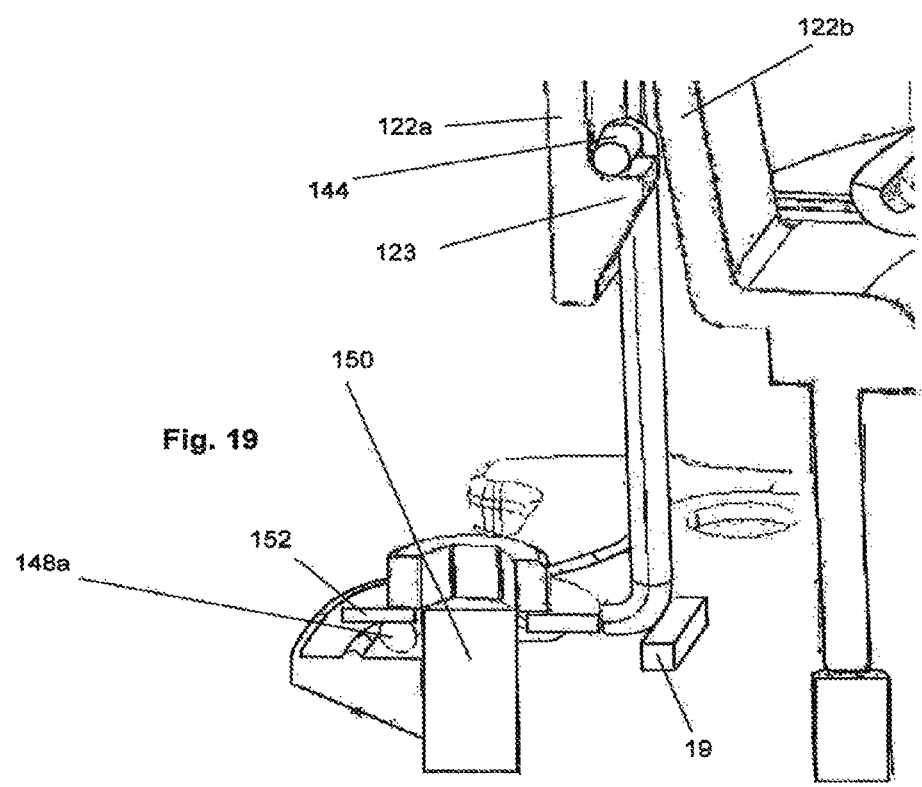
FIG. 19: Essentially showing what is depicted in FIG. 18, but in a cross-sectional representation.

As can be seen in particular in FIGS. 16 and 19, a protrusion 123 of the side wall 22*b* of housing 22 is used as module-side axial positioning element, and in the depicted exemplary examples of the second design, is designed as a double layer with an outer layer 122*a* and an inner layer 122*b* in the region of the axial positioning element. The protrusions 123 herein are each located at the outer side wall, so that the supporting part 142 is at a distance from the inner layer 122*b*, which is preferred.

Figure 20:
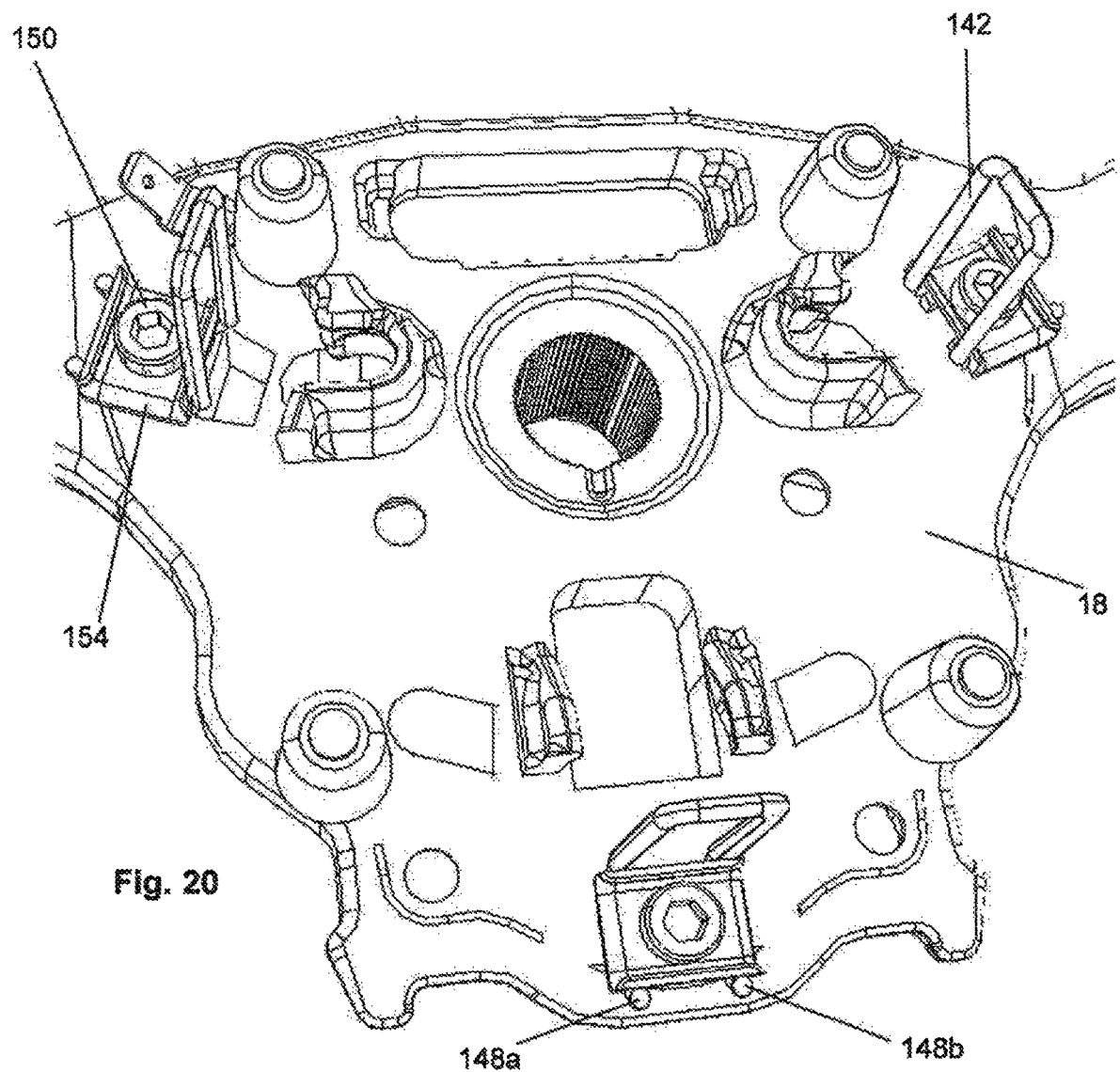
FIG. 20: A spacer plate on the side of the steering wheel body, to which three axial positioning elements are attached to the side of the steering wheel body and these elements are similar to those depicted in FIG. 17, FIG. 21: An additional variation of the first exemplary embodiment of the second design.

FIG. 20 shows a variation of the exemplary embodiment just described. The difference here is that instead of round washers, polygonal washer-plates 154 are used, and that the ends 148*a*, 148*b* of the support parts 142 point upward and extend parallel to each other. In this manner a very accurate radial positioning can be achieved, even without the presence of stops.

Figure 21:
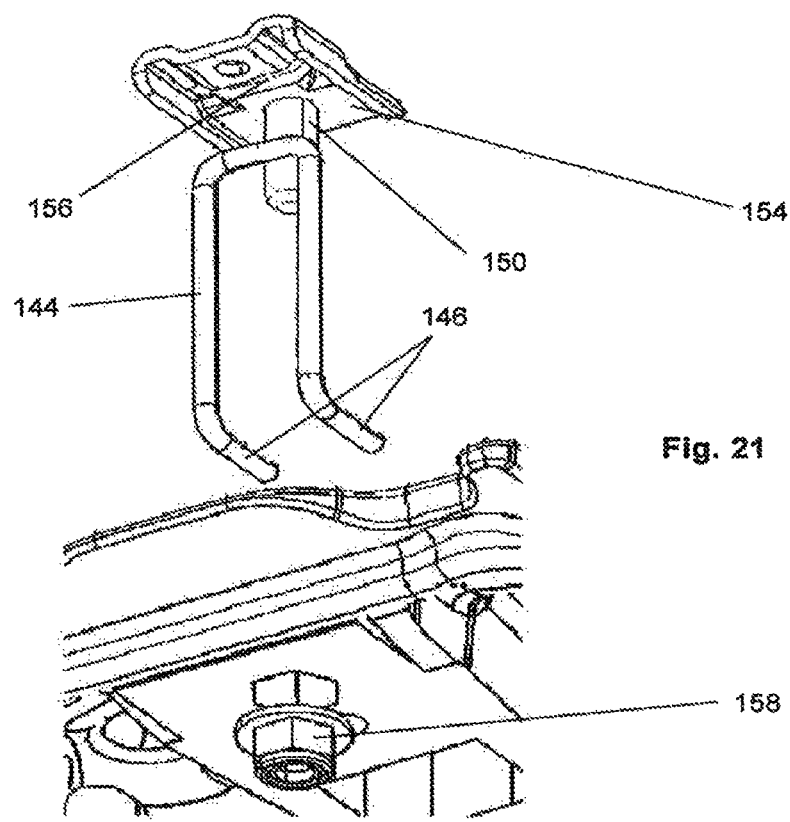

FIG. 21 shows another variation. The washer-plates 154 are slotted here, so that one lower section of the U-shaped, upper region 146 extends through each slot 156.

Figure 22:
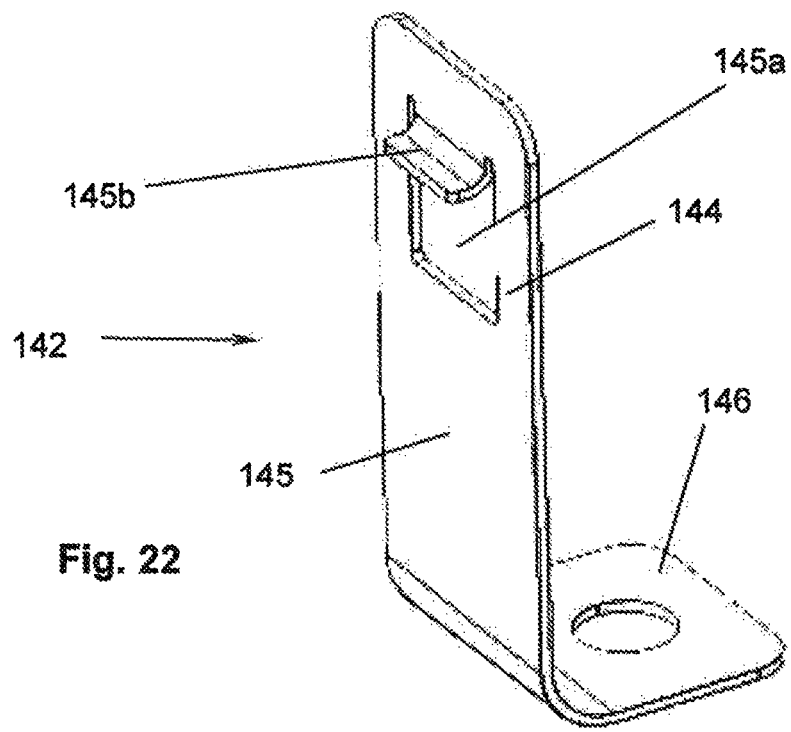
FIG. 22: A support unit of the axial positioning element on the side of the steering wheel body, according to a second design.
Figure 23:
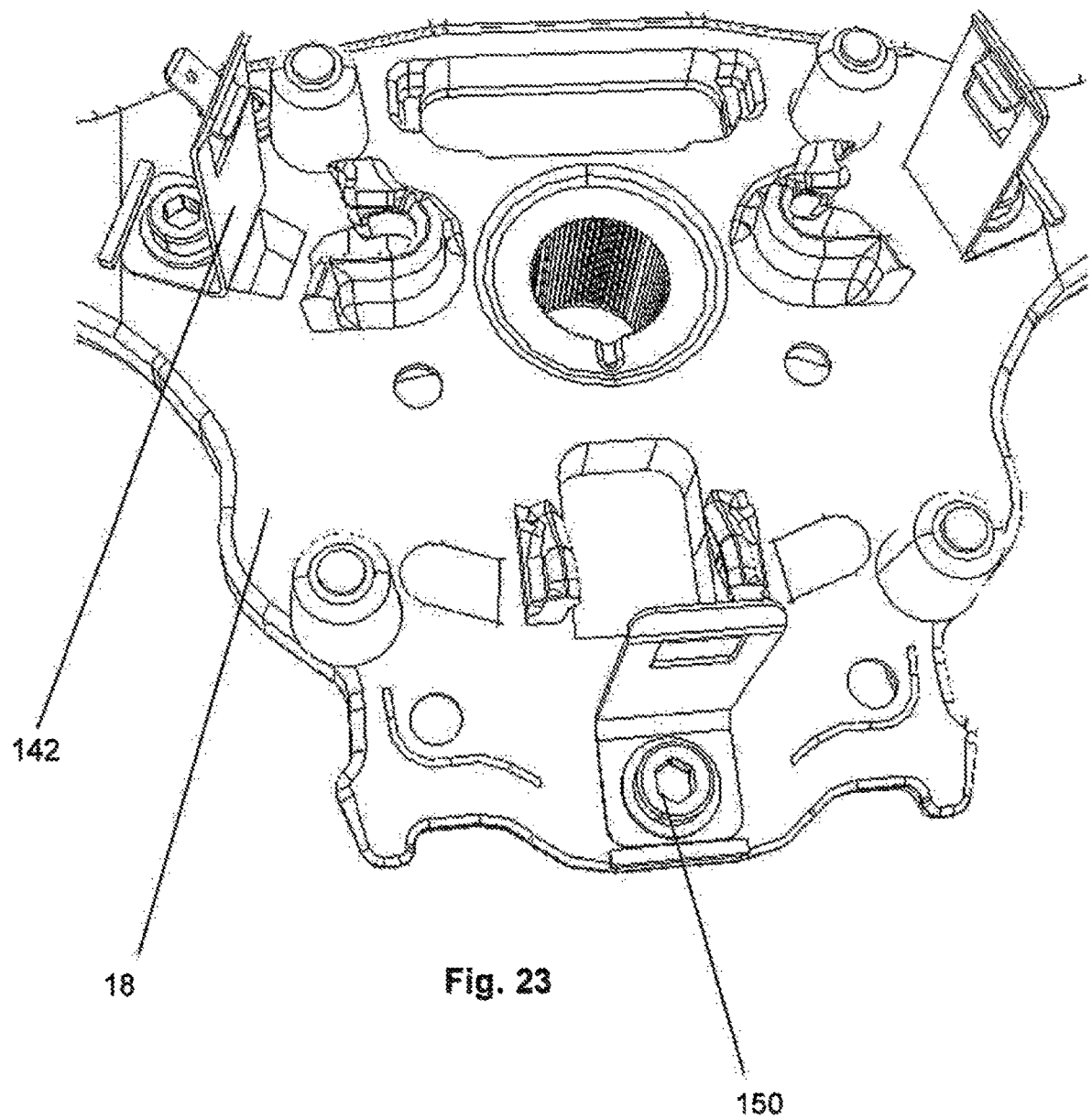
FIG. 23: A spacer plate on the side of the steering wheel body, to which three axial positioning elements are attached on the side of the steering wheel body, as they are depicted in FIG. 22, and FIG. 24: A portion of a spacer plate as viewed from below, in the state in which the axial positioning element is not yet mounted onto the side of the steering wheel body.

FIGS. 22 and 23 show a second exemplary embodiment of the second design of the invention. The support units 142 here are designed as flexible punched parts made of sheet metal, in particular steel sheet metal, with an upper section 145 and an attachment region 146, wherein the upper section 145 and attachment region 146 stand preferably perpendicular to each other. The attachment region 146 features a hole for insertion of a screw 150 or of a bolt. A window 145*a* is punched into the upper section 145 so that it has a U-shaped, upper region 144. In the illustrated, preferred exemplary embodiments, a curved section 145b extends essentially horizontally from each of the upper edges of the window 145a, so that an enlarged contact surface area is obtained, in comparison to the simple edge. A protrusion of the housing engages in the window 145a (as in the first exemplary embodiment as well).

Figure 24:
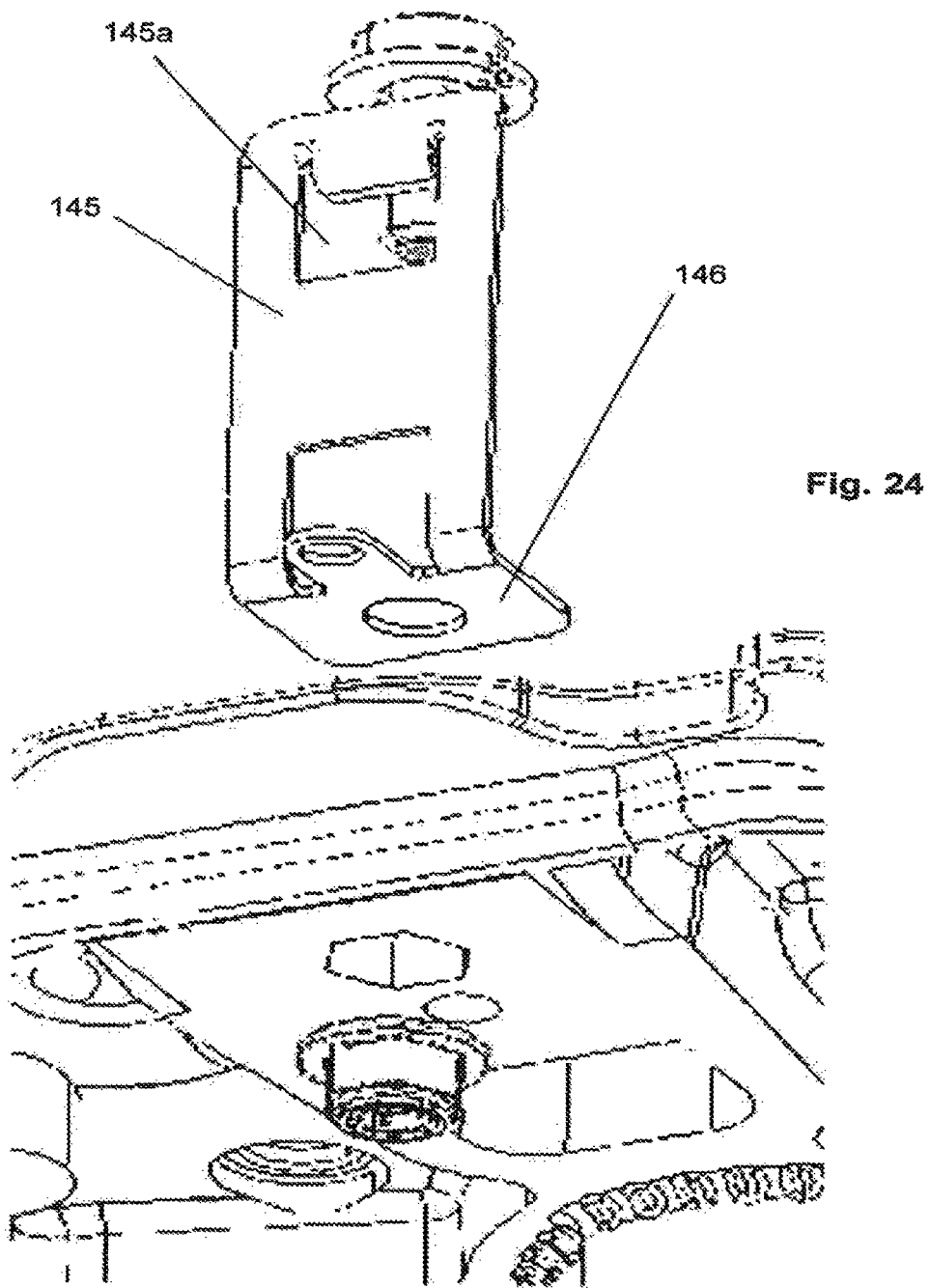

FIG. 24 shows a variation of the second exemplary embodiment. Here the attachment region 146 extends on both sides of the upper section 145.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel unit for a motor vehicle comprising, a steering wheel body;
an airbag module accommodated in a hub region of the steering wheel body, which includes a housing, an inflator connected to the housing, and an airbag folded into the housing; and
at least three axial positioning units which define the axial position of the housing when not pressed down with respect to the steering wheel body,
wherein each of the at least three axial positioning units includes an axial positioning element connected on a module side to the housing and connected to the steering wheel body on a steering wheel body side,
wherein the axial positioning element is formed as a metal support unit, and each of the support units for the at least three axial positioning units is a separate part from each other,
wherein at least one of the support units is a module-side axial positioning element or is a portion thereof and is disposed at a perimeter side wall of the housing, and at least one of the support units forms a U-shaped lower region and an upper region with at least one reinforcing section which is connected to the housing, and
wherein a radially protruding elastic radial positioning element is provided in a region of the module-side axial positioning element.

2. The steering wheel unit according to claim 1, further comprising, the housing is adapted to be pressed down against the steering wheel body against the force of at least one spring element.

3. The steering wheel unit according to claim 1, further comprising, the at least one reinforcing section points in the direction of the U-shaped lower region and is accommodated in a receptacle of the side wall of the housing.

4. The steering wheel unit according to claim 3, further comprising, the support unit includes two attachment sections which are formed by end sections of a wire piece.

5. The steering wheel unit according to claim 1, further comprising, the U-shaped lower region bears a plastic element which covers the support unit at least in sections.

6. The steering wheel unit according to claim 5, further comprising, the plastic element is snapped onto the support unit.

7. The steering wheel unit according to claim 1, further comprising the support units are flexible, bending parts made of sheet metal.

8. The steering wheel unit according to claim 1, further comprising, the radial positioning elements are a single piece with flexible, punched parts of the axial positioning elements.

9. The steering wheel unit according to claim 1, further comprising, the support units are made of a curved wire piece.

10. The steering wheel unit according to claim 1, further comprising, the protruding elastic radial positioning element extends between each of two parallel legs of the U-shaped regions.

11. A steering wheel unit for a motor vehicle comprising, a steering wheel body an airbag module accommodated in a hub region of the steering wheel body, which includes a housing, an inflator connected to the housing, and an airbag folded into the housing; and
at least three axial positioning units which define the axial position of the housing when not pressed down for a linear movement along an axial direction of the housing with respect to the steering wheel body,
wherein each of the at least three axial positioning units includes an axial positioning element connected on a module side to the housing and connected to the steering wheel body on a steering wheel body side,
wherein the axial positioning element is formed as a metal support unit, and each of the support units for the at least three axial positioning units is a separate part from each other,
wherein the support unit is positioned on the steering wheel body side and connected at a bottom of the hub region of the steering wheel body to the steering wheel body,
wherein the support unit forms a U-shaped upper region which is arranged substantially parallel to a perimeter side wall of the housing and the axial direction of the housing, and a mounting region which is connected to the steering wheel body, and
wherein the housing features a side wall which supports at least one protrusion acting as a module-side axial positioning element, wherein the protrusion is formed as a single piece with the side wall.

12. The steering wheel unit according to claim 11, further comprising, the mounting region extends generally parallel to the bottom of the hub region, perpendicular to the axial direction.

13. The steering wheel unit according to claim 12, further comprising, the mounting region is screwed or riveted to the bottom of the hub region.

14. The steering wheel unit according to claim 11, further comprising, the support unit is a flexible punched part produced from sheet metal with a punched out window.

15. The steering wheel unit according to claim 11, further comprising, the support unit is a curved wire piece.

16. The steering wheel unit according to claim 11, further comprising, the mounting region of the support unit is formed from two end sections of a wire piece.

17. The steering wheel unit according to claim 11, further comprising, the side wall is designed at least in sections in two layers with an outer layer and an inner layer and that the protrusion is located inside the cavity formed by the two layers.

18. The steering wheel unit according to claim 17, further comprising, the protrusion is disposed at the outer layer.

19. A airbag module with three axial positioning elements for use in the steering wheel unit according to claim 1.

20. A airbag module with three module-side axial positioning elements for use in the steering wheel unit according to claim 11.

* * * * *